United States Patent Office 3,375,069
Patented Mar. 26, 1968

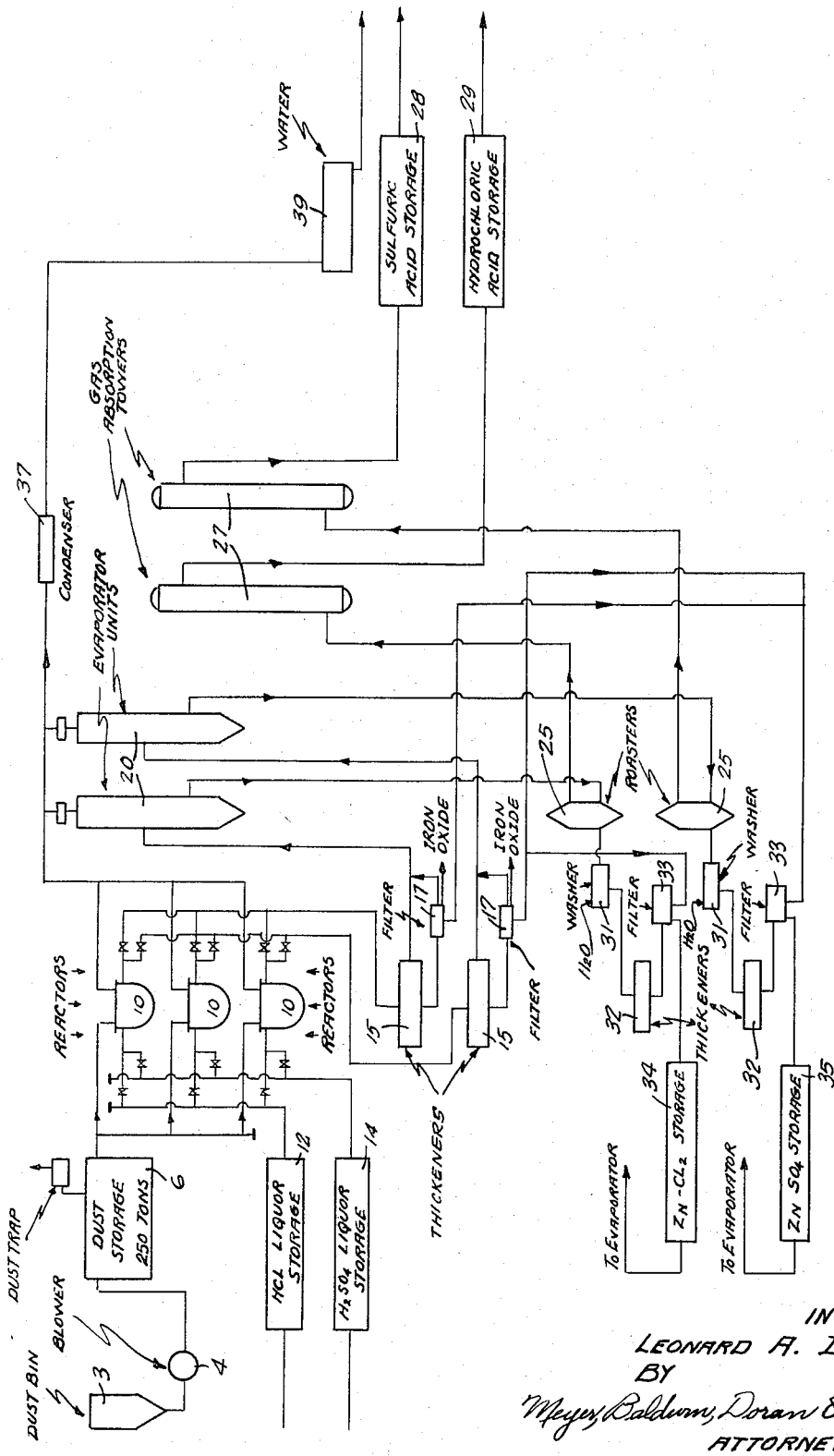

3,375,069
PROCESS FOR REMOVING ZINC OXIDE FROM IRON OXIDE FLUE DUST BY THE USE OF SPENT PICKLE LIQUOR
Leonard A. Duval, 207 Harmon Road, Aurora, Ohio 44202
Filed July 23, 1965, Ser. No. 474,436
2 Claims. (Cl. 23—200)

ABSTRACT OF THE DISCLOSURE

Undesirable amounts of zinc oxide are removed from iron oxide flue dust so as to render the flue dust valuable as a raw material for the blast furnace. The removal of the zinc oxide is accomplished by means of spent pickle liquor which is usually a waste product in the steel industry resulting from the use of hydrochloric acid or sulphuric acid for cleaning steel resulting in a product which is undesirable for dumping into lakes or streams. The method includes mixing the zinc-containing flue dust with the spent pickle liquor, reacting the mixture to convert a major portion of the zinc oxide to a salt of zinc and of the acid, either zinc chloride or zinc sulphate, then removing the iron oxide from the reacted mixture as a solid cake containing not over 0.50 percent by weight of zinc oxide which is acceptable for recharging in the blast furnace. The effluent from the reacted mixture which contains the zinc salt is evaporated to concentrate the salt and the water discharged from the evaporator is suitable for dumping into a lake or stream. The concentrated zinc salt may be further processed by roasting it to a zinc oxide which drives off HCl or $SO_3$ gas which may be passed through an absorption tower to recover hydrochloric or sulphuric acid.

---

The present invention relates to methods of removing undesirable materials from the flue dust and more particularly relates to the removal of undesirable materials such as zinc oxide from flue dust by reacting the same with a dilute acid to form a mixture including a zinc salt that can be removed from said mixture.

In the past, many attempts have been made to dispose of flue dust or convert the same to something of value, but the disposal of flue dust has remained a problem particularly to steel producers making steel by the basic oxygen process. Likewise in the past, attempts have been made to solve the problem of what to do with waste pickle liquor and how to dispose of the same without contaminating lakes and streams or how to economically convert the spent acid to something of value. In spite of said attempts, the problem of disposing of the waste pickle acid has remained and a great deal of time and money has been expended in trying to come up with an answer to said problem.

Therefore, it is an object of the present invention to provide methods of removing undesirable materials such as zinc oxide from flue dust such as that collected from a basic steel producing process so that the dust can be reused in an iron making process.

It is an object of the present invention to provide methods of removing undesirable materials from flue dust so that said dust can be reused in an iron making process by leaching the undesirable materials using a spent pickle acid liquor, thereby making use of both the flue dust and the spent pickle acid which are normally considered to be serious industrial waste disposal problems.

It is an object of the present invention to provide a method of removing undesirable materials such as zinc oxide from flue dust from a basic steel making process, the method comprising mixing the flue dust with a dilute acid that is preferably spent pickle acid having a pH of about 3 to 5½ to convert the zinc oxide to a zinc salt and removing the salt from the mixture to provide flue dust free from said zinc oxide.

These and other objects will become apparent from the specification that follows, the appended claims, and the drawings in which:

The figure is a float sheet illustrating the removal of undesirable materials such as zinc oxide from flue dust by leaching the dust with spent pickle acid.

The present invention provides a method of removing undesirable materials such as zinc oxide from flue dust by continuously leaching the dust with a dilute acid such as spent pickle acid to remove the zinc oxide as a zinc salt, continuously removing the zinc salt from the dust in the form of a zinc salt slurry and continuously evaporating and concentrating the same to produce zinc chloride, and thereafter continuously roasting the zinc chloride to produce zinc oxide.

As seen in the drawings, flue dust from a basic steel making process containing zinc oxide as an undesirable material is stored in dust bin 3 where it is moved by a blower 4 into a large dust storage tank 6 of a size such as would hold 250 tons of dust. The dust is then continuously fed into one of a group of reactors 10 where the zinc oxide is leached from the dust by a dilute acid such as spent hydrochloric acid from pickling which is pumped to the reactor 10 from HCl liquor storage 12 or spent sulfuric acid from pickling which is pumped to the reactor 10 from $H_2SO_4$ liquor storage 14.

In each of the reactors 10, the temperature of reaction is kept at about 150° to 250° F. After the reaction in which a zinc salt is formed (which is zinc chloride when spent HCl pickle liquor is used), the zinc salt and iron oxide slurry is moved to a thickener 15 and then to a filter 17 which filters out the iron oxide to provide a solid cake containing about 65% by weight of iron and about 15% by weight of water. The filtrate from filter 17 contains the zinc salt (zinc chloride or zinc sulfate), some iron salt (iron chloride or iron sulfate), as well as the acid (HCl or $H_2SO_4$) and water.

The filtrate is continuously fed into an evaporator unit 20 where the filtrate is concentrated. The concentrated filtrate is thereafter moved to a roaster 25 and roasted at about 270° F. to produce zinc oxide and where HCl gas or $SO_3$ gas is continuously given off and moved through a gas absorption tower 27 to either a sulfuric acid storage tank 28 or a hydrochloric acid storage tank 29.

As seen in the lower left-hand corner of the flowsheet, the product from the roaster is mixed with water in a washer 31, the resultant slurry fed to thickener 32 and the concentrated slurry then fed to a filter 33 where the zinc salt in the filtrate is moved to a zinc salt storage area which is $ZnCl_2$ storage 34 or $ZnSO_4$ storage 35.

The $ZnCl_2$ can be allowed to accumulate in storage 34 and also $ZnSO_4$ can be allowed to accumulate in storage 35. The accumulation of the $ZnCl_2$ or $ZnSO_4$ can be charged into the evaporator units periodically, as for instance on a weekend, and the water removed therefrom to provide the solid salt. The water removed from the evaporator units 20 passes through condenser 37 into a storage vessel 39. The resultant water in vessel 39 then can be used in a manufacturing operation, the same being clean and free from large amounts of salts.

As an example of the flue dust that can be advantageously and effectively handled, a typical flue dust analysis is as follows:

| Ingredient: | Percent by weight |
|---|---|
| Iron | 61–62 |
| Sulfur | 0.23 |
| Zinc oxide | 2.5–4.5 |
| Water | 10–15 |
| Silica | 2.4 |
| Manganese | .36 |
| Phosphorous | .04 |
| Chromium | .24 |

The flue dust processed according to the present invention preferably has at least about 50% by weight of iron oxide and ¼ to 4% zinc oxide.

In leaching the zinc oxide from a dust such as the above described material, for commercially feasible reaction rates and results the pH of the dilute acid in the effluent from the reactor must be in the range of at least about 1 to 1½ and generally about 3 to 5½ and preferably about 4½ to 5 for converting the zinc oxide to a zinc salt economically and satisfactorily on a continuous basis to thereby convert the flue dust from an industrial waste material with disposal problems to a material of value.

The reaction temperature of the reaction between the dust and the dilute acid should be in the range of about 150° F. to 250° F. although a temperature of about 175° F. to 225° F. is generally preferred. It has been found that when the reaction temperature is below about 150° F., the reaction rate is so decreased that a greater retention time in the reaction vessel is required than is economically feasible. Also, the effluent will contain more acid than the equipment and the balance of the process has been designed for, an economical process being an essential element. Thus, the slowing down of the process and the need for larger pieces and expensive pieces of equipment are not commercially feasible changes and, hence, a lower reaction temperature than 150° F. cannot be employed.

The temperature of the reaction should not be greater than about 250° F. the reaction being carried out generally at the normal boiling point of the solution at the operating pressure in the reactor, the boiling point being determined mainly by the salt concentration of the spent pickle liquor used. Although atmospheric pressure is preferred, generally however the reaction can proceed under pressures both greater and lower than atmospheric.

It is preferred that the dilute acid used for leaching be a spent pickle liquor from pickling operations using either hydrochloric or sulfuric acid.

When using spent sulfuric acid pickle liquor, the acid concentration thereof should be kept within about 0.5% to 6% by weight so that the effluent from the reactor has a pH of about 3 to 5½. When using spent hydrochloric acid pickle liquor the amount of HCl in the feed should be about 0.5% to 4% so that the effluent from the reactor preferably will have a pH of about 3 to 5.

The effluent pH should be at least about 1½ and for commercial feasibility should be at least about 3 because an effluent with a lower pH cannot be discarded properly and economically into a sewer or stream. If the pH is lower than 3, there is still acid present to react with the ZnO-Fe$_3$O$_4$ mix to remove Zn later on when not desired. Furthermore, an effluent having a pH lower than about 3 is too corrosive to processing equipment used in recovering salt solutions.

If the effluent has a pH of over about 5½ or over 5 in the case of spent HCl, which at the same concentration as H$_2$SO$_4$ will give a slightly higher pH, the resultant reaction time is generally much too long to reach the point of neutralization of the acid and conversion of the zinc oxide to zinc sulfate or zinc chloride.

Also, keeping the pH below about 5½, there is a minimum of conversion of the iron oxide of the dust to iron sulfate, FeSO$_4$. The conversion of iron to iron sulfate or iron chloride is undersirable inasmuch as it represents a loss of iron value for reuse as an oxide and the iron so converted necessitates recovery from its iron salt, either sulfate or chloride, depending upon the acid used.

It has been found that it is highly desirable to thoroughly wash the filter cake from the filter 17, the filter cake before the washing comprising iron oxide particles. Each of the iron oxide particles apparently has a thin coating of zinc chloride or iron chloride clinging to it and this coating must be removed so that uncontaminated iron oxide can be produced for reuse in, for instance, iron making processes.

The following examples are intended to illustrate the present invention and not to limit it in any way:

EXAMPLE

Two different flue dust samples were reacted with spent hydrochloric acid pickle liquor employing various reaction times and temperatures. Flue dust sample No. 1 contained approximately 63.1% by weight of iron and 0.8% by weight of zinc. Flue dust sample No. 2 contained approximately 63.3% iron and 0.78% zinc.

Results of said reactions are set forth below, the results including the percentage of iron and zinc remaining in the reacted dust and the pH of the spent liquor effluent:

REACTION NO. 1—15 MIN., 180° F.

| | Percent Fe | | Percent Zn | | pH Effluent Liquor |
|---|---|---|---|---|---|
| | Before | After | Before | After | |
| Dust No. 1 | 63.1 | 61.7 | 0.8 | 0.5 | |
| Dust No. 2 | 63.3 | 62.2 | 0.78 | 0.45 | |
| Liquor | 9.3 | | | | >1 |

REACTION NO. 2—30 MIN., 180° F.

| Dust No. 1 | 63.1 | 60.6 | 0.8 | 0.2 | |
| Dust No. 2 | 63.3 | 61.1 | 0.78 | 0.18 | |
| Liquor | 9.3 | | | | Approx. 2 |

REACTION NO. 3—45 MIN., 180° F.

| Dust No. 1 | 63.1 | 60.9 | 0.8 | 0.1 | |
| Dust No. 2 | 63.3 | 60.7 | 0.78 | None | |
| Liquor | 9.3 | | | | 4.5 |

REACTION NO. 4—15 MIN., 200° F.

| Dust No. 1 | 63.1 | 62.7 | 0.8 | 0.46 | |
| Dust No. 2 | 63.3 | 61.8 | 0.75 | 0.42 | |
| Liquor | 9.3 | | None | Trace | 1 |

REACTION NO. 5—30 MIN., 200° F.

| Dust No. 1 | 63.1 | 61.6 | 0.8 | Trace | |
| Dust No. 2 | 63.3 | 61.2 | 0.78 | <0.01 | |
| Liquor | 10.1 | | | Trace | 2 |

REACTION NO. 6—45 MIN., 200° F.

| Dust No. 1 | 63.1 | 61.3 | 0.8 | Trace | |
| Dust No. 2 | 63.3 | 60.9 | 0.78 | <0.01 | |
| Liquor | 10.4 | | | <0.01 | 4 |

It can be seen from the above data, that considerable amounts of zinc are removed from the flue dust samples by reaction under the above identified conditions of time and temperature.

Although reactions Nos. 1, 2 and 4 removed substantial amounts of zinc, such reactions were not feasible from the standpoint of dumping the effluent liquor into a lake or stream, the pH being too high for non-contaminating disposal.

It is to be understood that various modifications of the methods herein described may be made without departing from the spirit and the scope of the invention.

What is claimed is:

1. The method of removing undesirable zinc oxide from iron oxide flue dust by the use of spent pickle liquor while rendering the liquor suitable to dump into a lake or stream comprising mixing flue dust containing at least 50 percent by weight of iron oxide and containing zinc oxide in undesirable amounts with a spent pickle liquor chosen from the group consisting of weak hydrochloric acid and weak sulphuric acid, reacting said mixture at a temperature of about 150° F. to 250° F. to convert a major portion of said zinc oxide to a salt of zinc and said acid, the effluent from said reaction being in the range of 1.0 to 5.5 pH, removing the iron oxide from said reacted mixture as a solid cake containing not over 0.50 percent by weight of zinc oxide, evaporating the effluent from said reacted mixture containing said zinc salt to concentrate said salt, and discharging from said evaporator water suitable for dumping into a lake or stream.

2. The method of claim 1 including the step of roasting said concentrated zinc salt producing zinc oxide while driving off HCl or $SO_3$ gas, and passing said gas through an absorption tower to recover hydrochloric or sulphuric acid.

References Cited

UNITED STATES PATENTS

| | | | |
|---|---|---|---|
| 220,449 | 10/1879 | Wahl et al. | 23—97 |
| 1,066,245 | 7/1913 | Betts | 23—125 |
| 1,879,373 | 9/1932 | McComb | 23—200 X |
| 2,305,829 | 12/1942 | Pieper | 75—120 X |
| 3,143,486 | 8/1964 | Pickering et al. | 75—120 X |

OTHER REFERENCES

Kraiker, "Dispose of Pickle Liquor at a Profit," Chemical Engineering, vol. 56, No. 3, March 1949, pp. 112–115 and 144–147.

OSCAR R. VERTIZ, *Primary Examiner.*

MILTON WEISSMAN, *Examiner.*

G. T. OZAKI, *Assistant Examiner.*